A. H. BRUNNER.
COOKING UTENSIL.
APPLICATION FILED APR. 22, 1919.
1,316,827.  Patented Sept. 23, 1919.
Fig. 1.
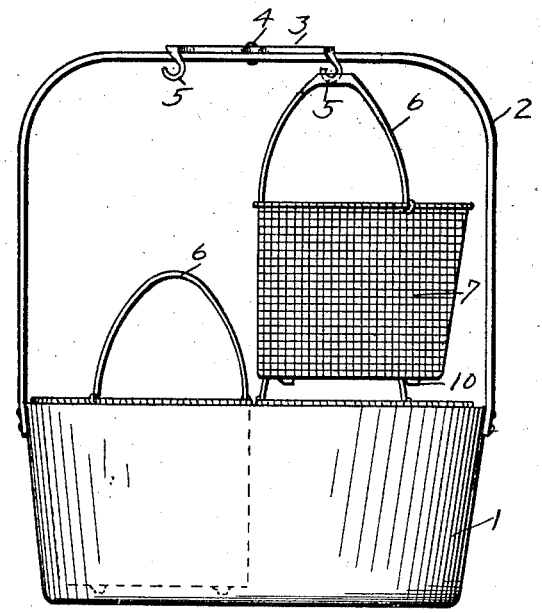
Fig. 3.
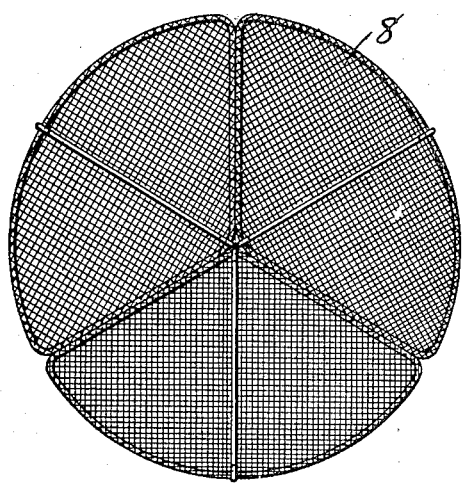
Fig. 2.
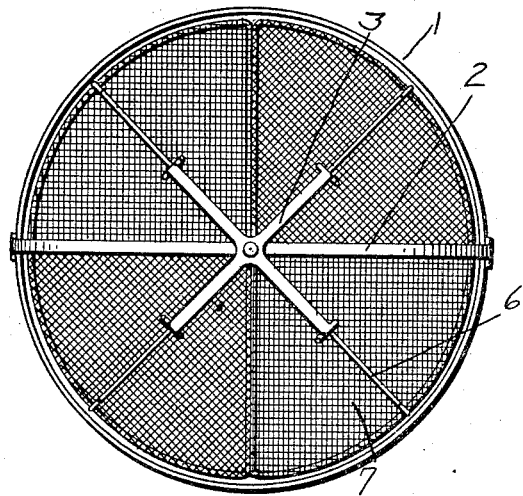
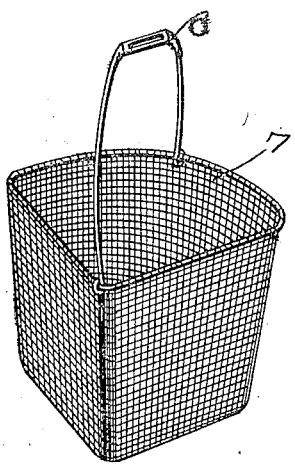
Fig. 4.
INVENTOR
A. H. Brunner
BY
*Munn & Co.*
ATTORNEYS

UNITED STATES PATENT OFFICE.

ALBERT HARRY BRUNNER, OF MARION, ILLINOIS.

COOKING UTENSIL.

1,316,827.  Specification of Letters Patent.  Patented Sept. 23, 1919.

Application filed April 22, 1919. Serial No. 291,837.

*To all whom it may concern:*

Be it known that I, ALBERT H. BRUNNER, a citizen of the United States, and a resident of Marion, in the county of Williamson and State of Illinois, have invented certain new and useful Improvements in Cooking Utensils, of which the following is a specification.

My invention is an improvement in cooking utensils, and has for its object to provide a device of the character specified especially adapted for cooking orders of oysters, potatoes or the like, as, for instance, French fried potatoes, Saratoga chips and the like, wherein a support is provided, and a series of baskets of perforate material, each adapted to contain an order of oysters, potatoes or the like, which may be lowered into the fat to cook the contents thereof, and which may be afterward removed from the fat, to permit the fat to drain off from the contents.

In the drawings:

Figure 1 is a side view of the improved utensil,

Fig. 2 is a top plan view,

Fig. 3 is a plan view of the baskets removed,

Fig. 4 is a perspective view of one of the baskets.

In the present embodiment of the invention, a suitable pot or kettle 1 is provided, having a rigid bail 2, which extends upwardly from opposite sides of the kettle and diametrically of the kettle, and a cross 3 is secured to the bail at its center by means of a rivet 4 or the like.

The arms of this cross have hooks 5, and these arms are adapted to be engaged by the bails 6 of perforate containers 7. Each of these containers is composed of a ring or frame for the top and a bottom and side walls of reticulated material, as, for instance, wire mesh, and each basket has its horizontal cross section sector shaped. Thus several of the baskets may be arranged together to form a complete circle, as, for instance, in Figs. 2 and 4 the curved sides of the baskets are ninety degrees in length so that four baskets constitute a circle.

In Fig. 3 each basket 8 has its curved side of one hundred twenty degrees in length so that three baskets complete the circle. With this construction the cross would have three arms and three hooks for engagement by the bails 9 of the three baskets.

In use, the orders to be cooked, as, for instance, French fried potatoes, are placed in the individual baskets. The pot or kettle having the fat receives the baskets as indicated in Fig. 1. After the material has been cooked, the baskets are lifted so that the bails engage the hooks and the fat is permitted to drip off.

Referring to Fig. 1, it will be noticed that each basket has on its bottom feet 10 for engaging the bottom of the vessel 1 to support the basket out of contact with the bottom.

I claim:

In combination, a container for fat having a rigid bail extending upwardly therefrom, a series of sector shaped perforate receptacles adapted to seat within the container, each receptacle comprising a reticulated body and a bail, the bail of the container having at the center of the body thereof a member provided with radiating arms corresponding in number to the receptacles, each arm having a hook for engaging the bail of the adjacent receptacle to support the same in draining position above the fat in the container.

ALBERT HARRY BRUNNER.